Aug. 31, 1943. C. MACCARINI 2,328,085
APPLICATION OF CORDS TO FOOD PRODUCTS
Filed Dec. 12, 1941
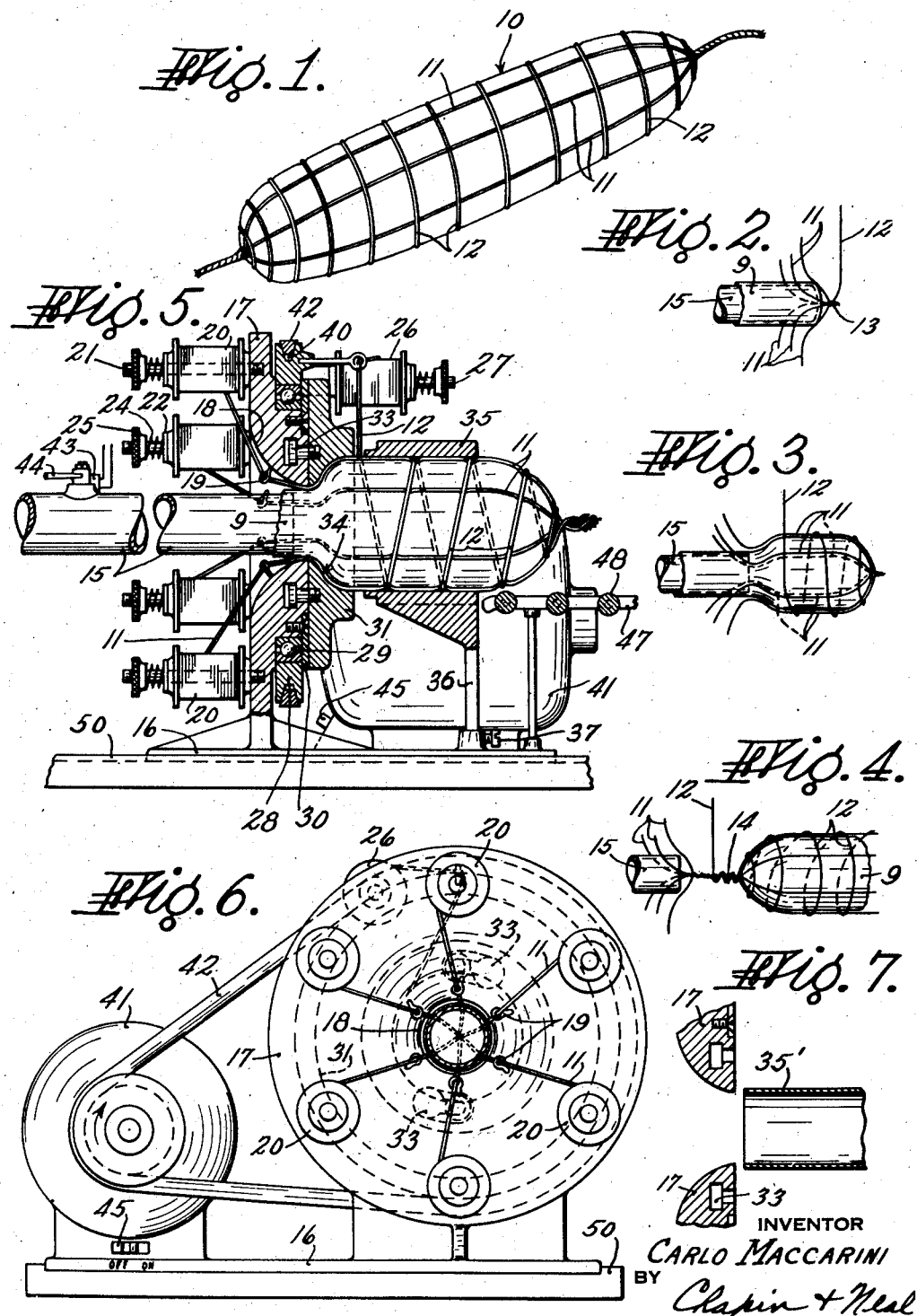
INVENTOR
CARLO MACCARINI
BY
Chapin + Neal
ATTORNEYS Patented Aug. 31, 1943

2,328,085

UNITED STATES PATENT OFFICE 2,328,085

APPLICATION OF CORDS TO FOOD PRODUCTS

Carlo Maccarini, Springfield, Mass.

Application December 12, 1941, Serial No. 422,723

10 Claims. (Cl. 17—1)

This invention relates to a method and machine for use in the application of cord or twine to the exterior of sausage casings and other food products.

In the manufacture of sausages it is usual with certain types of sausages, such as Italian salami, summer sausages, coppa, and similar forms, to apply cord or twine to the exterior of the sausage casing. This cording among other purposes serves to compact the filling and press and hold the casing in such manner that no air spaces occur in the casing or is permitted to form as the sausage dries.

As far as I am aware, this cording has customarily been done by hand after the sausage leaves the casing machine or the sausage is forced into a loosely knitted or netted bag which serves the same purpose as the cording. The cording of the sausage and similar products requires some skill and consumes a substantialy amount of time.

It is the principal object of my invention to provide a method of, and a relatively simple mechanism for, applying the cord to sausages and the like which avoids substantially all handling of the sausage in the application of the cord.

A further object is to provide a mechanism which may be so combined with a sausage machine as to perform the cording operation substantially simultaneously with the stuffing of the casing.

A still further object is to secure a neater and more attractive looking product and greater assurance that no air pockets occur within the casing.

Other and further objects will be apparent from the following specification and claims.

In the accompanying drawing which illustrates one embodiment of my invention,

Fig. 1 is a perspective view of a sausage corded according to my invention;

Figs. 2, 3, and 4 are diagrammatic views showing the steps of applying the cord;

Fig. 5 is a side elevational view of a machine embodying my invention, partly in section and with parts broken away;

Fig. 6 is an end elevational view, looking from the left of Fig. 5; and

Fig. 7 is a fragmentary sectional view showing the arrangement of the parts when solid food products are to be corded.

Referring to Fig. 1 of the drawing, the sausage is generally indicated at 10 and the cording is shown as comprising a plurality of longitudinally arranged cords 11 and a spirally arranged cord 12 overlying the cords 11. The steps and manner of applying the cords are diagrammatically shown in Figs. 2, 3, and 4. The longitudinal cords 11 are guided in radial formation toward each other and their ends and the end of cord 12 knotted together as indicated at 13; the end of the sausage is then moved against the knotted cords as shown in Figs. 2 and 3 to lay the cords 11 along the sides of the sausage and simultaneously cord 12 is wound around the advancing sausage, the movement of the latter resulting in the spiral lay of cord 12. When the end of the sausage is reached the spiral cord is wound around the bunched cords 11 as at 14 in Fig. 4, thus bringing the cord together again in radial form ready for another sausage. When the sausages are cut apart, the bunched cords may be tied or otherwise secured in any suitable manner.

Preferably the cording is applied simultaneously with the stuffing of the casing and in Figs. 5 and 6 I have shown my cording machine combined in operative relation with the horn 15 of a sausage stuffing machine. The operative parts of my device are carried by a suitable base 16 and comprise an annular member 17 positioned in axial alignment with the horn 15. The throat 18 formed on the side of member 17 adjacent horn 15 is provided with a plurality of circumferentially spaced guide eyes 19 for the longitudinal cords 11. Cords 11 are supplied from spools or other packages 20 which as shown are mounted on spindles 21 secured to member 17 but may be carried by any suitable form of support. Each spool is preferably provided with a tension device such as a washer 22 mounted on the spool spindle 21 and pressed against the spool by a coiled spring 24 positioned between the washer and a nut 25, threaded on the end of the spindle, by which the tension on the several cords may be adjusted. Any suitable type of adjustable tension device may be used. The cord 12 is supplied from a spool 26 mounted on a spindle 27 carried by a ring member 28. Spindle 27 is provided with an adjustable tension device such as described for the spindles of spools 20. Ring member 28 is rotatably mounted on member 17 by means of bearing 29 and annular plate 30 secured to member 17. An annular backing die 31 is releasably secured, as by a bayonet connection 33, to member 17 with its central opening in alignment with the openings of member 17 and horn 15. The throat 34 of backing die 31 is shaped to accommodate and support the sausage as it expands to shape on leaving the stuffing horn, and it will be understood that dies of appropriate size and shape will be employed as needed for the various sizes of sausages being made. Slightly spaced from die 31, and conforming in diameter to the maximum diameter of the die, is a cylindrical member 35 which acts as a continuation of the die in supporting the sausage. The cylinder 35 is releasably mounted on base 16 by a shank 36 and set screw 37, and the cylinder 35 will be changed as needed to correspond with the size of die 31. Cord 12 is wound around the advancing sausage through the narrow space between die 31 and the adjacent end of cylinder 35. The openings in members 17, die 31, and cylinder 35 form a guideway which defines the path of movement of the sausage.

The periphery of ring member 28 is provided with a belt receiving groove 40 and is driven from a motor 41 by a belt 42. Preferably the circuit of motor 41 can be closed either from a switch generally indicated at 43 and which is actuated by the movement of valve 44 of the sausage stuffing machine to start the motor simultaneously with the start of the stuffing of the casing, or from an independent switch 45, for reasons later described.

Preferably a table member 47 having anti-friction rolls 48 is provided to receive the corded sausage.

As shown, base member 16 is slidably mounted in guideways 50 so that the cording device may be moved away from horn 15 to facilitate placing the casing thereover.

In operation, assuming an empty casing 9 to be positioned on horn 15 and the cording device to be positioned adjacent thereto as in Fig. 5, with the cords knotted together as in Fig. 2, valve 44 is opened to extrude the sausage meat into the casing, and force the casing and cords 11 through member 17, die 31, and cylinder 35. The opening of valve 44 closes switch 43 to simultaneously start the motor 41 and drive ring member 28 to wind cord 12 about the advancing sausage. When the casing is filled to the proper length valve 44 is closed, stopping the flow of meat and stopping motor 41. The operator then grasps the sausage, and closing switch 45 to restart the motor, advances the sausage a short distance by hand to wind cord 12 down over the end of the sausage and around the cords 11 for a short distance to prepare the cords for the next operation. The cording device is then moved away from the horn 15 while another casing is placed thereover. The cording device is then returned to position, and the operation repeated. The cords between the corded sausages may be severed as the cording progresses or after several cording operations. As will be obvious, link sausages formed from a long length of casing may be corded by my machine as well as individual sausages.

When sausages already encased are to be corded, that is when the device is used apart from the stuffer, the sausages will be introduced into, and moved through the machine by hand or by any suitable conveying means.

Some meat products which it is desirable to cord, such as coppa, are so firm and solid that no expansion takes place. For cording products of that nature, die 31 will be removed as in Fig. 7 and cylinder 35' will have the diameter of the opening of member 17. The meat package can then be fed by hand through the opening of member 17 and cylinder 35' to receive the cords as previously described. The same arrangement may be used for already encased sausages when found desirable.

It will be understood that various changes may be made in the constructional details of my machine without departing from my invention.

It will also be obvious that any desired number of longitudinal cords 11 may be used and that the closeness of turns of the spiral cord may be adjusted as desired by adjusting the relative speed of rotation of the winding member or the speed of advance of the sausage or both. The longitudinal cords are firmly held in place by the spiral cord and the tightness of the cords may be nicely adjusted to meet the needs of different meat products by means of the cord tensioning devices.

What I claim is:

1. A device for applying cords to sausages and similar meat products which comprises a guide-way to direct the sausage in a predetermined path of advance, means to guide a plurality of cords, in spaced relation, longitudinally along the sausage as it is moved along said guide-way, said guide-way including means to press the cords tightly against the sausage, and means to simultaneously wind a cord in a free spiral around the sausage and over the longitudinal cords.

2. A device for applying cords to sausages and similar meat products which comprises a guide-way to direct the sausage in a predetermined path of advance, means to guide a plurality of cords, in spaced relation, longitudinally along and against the sausage as it is moved into and along said guide-way, means to simultaneously wind a cord in a free spiral around the sausage and over the longitudinal cords, and means to impose a predetermined tension on the several cords.

3. A device for applying cords to sausages and similar meat products which comprises a guide-way to direct the sausage in a predetermined path of advance, means to guide a plurality of cords, in spaced relation, tightly against and longitudinally along the sausage as it is moved into and along said guide-way, and means mounted for rotation about the sausage as the latter is advanced along the guide-way to wind a cord spirally around the sausage and over the longitudinal cords.

4. A device for applying cords to sausages and similar meat products which comprises a guide-way to direct the sausage in a predetermined path of advance, said guide-way including an annular member provided with a sausage engaging throat through which the sausage is moved, a plurality of cord guides spaced circumferentially around said throat for guiding cords, in spaced relation, longitudinally along and against the sausage as it is moved through the throat, means spaced from said cord guides in the direction of sausage movement and mounted for rotation about the sausage as the latter is advanced along the guide-way to wind a cord spirally around the sausage and over the longitudinal cords, and means to supply cords to said cord guides and said cord winding means.

5. A device for applying cords to sausages and similar meat products which comprises a guide-way to direct the sausage in a predetermined path of advance, said guide-way including an annular member provided with a sausage enaging throat through which the sausage is moved, a plurality of cord guides spaced circumferentially around said throat for guiding cords, in spaced relation, longitudinally along and against the sausage as it is moved through the throat, means positioned beyond the throat for supporting the sausage, means mounted for rotation about the sausage as the latter is advanced along the guide-way to wind a cord spirally around the sausage and over the longitudinal cords, and means to supply cords to said cord guides and said cord winding means.

6. A device for applying cords to sausages and similar meat products which comprises a guide-way to direct the sausage in a predetermined path of advance, said guide-way including an annular member provided with a throat through which the sausage is moved, a plurality of cord guides spaced circumferentially around the throat for guiding cords, in spaced relation, longitudinally along the sausage as it is moved through the throat, a die member positioned beyond the throat for supporting and shaping the sausage, a cylindrical supporting member spaced from said die, a member mounted for rotation about the sausage as the latter is advanced through the die and the cylindrical supporting member to wind a cord spirally around the sausage and over the longitudinal cords through the space between the die and said cylindrical member, and means to supply cords to said guides and said cord winding means.

7. A device for applying cords to sausages and similar meat products which comprises a guide-way to direct the sausage in a predetermined path of advance, said guide-way including an annular member provided with a throat through which the sausage is moved, a plurality of cord guides spaced circumferentially around the throat for guiding cords, in spaced relation, longitudinally along the sausage as it is moved through the throat, a die member positioned beyond the throat for supporting and shaping the sausage, a cylindrical supporting member spaced from said die, a member mounted for rotation about the sausage as the latter is advanced through the die and the cylindrical suporting member to wind a cord spirally around the sausage and over the longitudinal cords through the space between the die and said cylindrical member, and means to supply cords to said guides and said cord winding means, said cord supplying means including a predetermined degree of tension on the cords.

8. In combination with a sausage stuffing machine having a valve controlled stuffing horn, a device for applying cords to sausages as they are extruded into casings from said horn, comprising, a throated member, the throat of which is axially aligned with said horn, a plurality of cord guides spaced circumferentially around the throat for guiding cords, in spaced relation, longitudinally along the encased sausages as they are extruded through the throat of said member, a die member positioned beyond the throat for supporting and shaping the sausage, a member mounted for rotation about the sausage to wind a cord spirally around the sausage and over the longitudinal cords, power means for rotating said winding member, means to automatically start and stop the rotation of said winding member upon the opening or closing, respectively, of the valve of the stuffing horn, and a second control means for said power means operating independently of said valve.

9. The method of applying cords to sausages and similar meat products which comprises, connecting the ends of a plurality of cords together, arranging said cords radially about said point of connection, advancing the sausage endwise against the point of connection of the cords to lay said cords, in a spaced relation, longitudinally of the sausage, and winding a cord in a free spiral around the sausage and over the longitudinally laid cords, said last-named cord being secured to the other cords only at their said point of connection.

10. The method of applying cords to sausages and similar meat products which comprises, connecting the ends of a plurality of cords together, arranging said cords radially about said point of connection, advancing the sausage endwise against the point of connection, while restraining the sausage against radial expansion, to lay said cords, in spaced relation, longitudinally of the sausage, and winding a cord in a free spiral around the sausage and over the longitudinally laid cords, said last-named cord being secured to the other cords only at their said point of connection, and thereafter freeing the sausage from restraint against radial expansion.

CARLO MACCARINI.